US009185450B2

(12) United States Patent
Barrett (10) Patent No.: US 9,185,450 B2
(45) Date of Patent: Nov. 10, 2015

(54) MANAGING COMMON CONTENT ON A DISTRIBUTED STORAGE SYSTEM

(75) Inventor: Timothy Alan Barrett, Pymble (AU)

(73) Assignee: THOMSON LICENSING, Issy les-Moulineaux (FR)

( * ) Notice: Subject to any disclaimer, the term of this patent is extended or adjusted under 35 U.S.C. 154(b) by 68 days.

(21) Appl. No.: 14/006,604

(22) PCT Filed: Jun. 29, 2011

(86) PCT No.: PCT/IB2011/001525
§ 371 (c)(1),
(2), (4) Date: Sep. 20, 2013

(87) PCT Pub. No.: WO2013/001325
PCT Pub. Date: Jan. 3, 2013

(65) Prior Publication Data
US 2014/0013368 A1     Jan. 9, 2014

(51) Int. Cl.
*H04N 7/173* (2011.01)
*H04N 21/433* (2011.01)
*H04N 21/231* (2011.01)
*H04N 21/63* (2011.01)
*H04L 29/08* (2006.01)

(52) U.S. Cl.
CPC ........ *H04N 21/4334* (2013.01); *H04L 67/1097* (2013.01); *H04N 21/23116* (2013.01); *H04N 21/632* (2013.01)

(58) Field of Classification Search
CPC .......... H04N 21/47202; H04N 21/274; H04N 21/4147; H04N 21/4325; H04N 21/442; H04N 21/44231
USPC .......................................... 725/97, 86, 87, 95
See application file for complete search history.

(56) References Cited

U.S. PATENT DOCUMENTS

| 5,805,203 A * | 9/1998 | Horton .......................... 725/119 |
| 2007/0157266 A1 * | 7/2007 | Ellis et al. ...................... 725/89 |

(Continued)

FOREIGN PATENT DOCUMENTS

| WO | WO2007073468 | 6/2007 |
| WO | WO2008113948 | 9/2008 |

OTHER PUBLICATIONS

Douceur, John R., et al.. "Reclaiming space from duplicate files in a serverless distributed file system." Distributed Computing Systems, 2002. Proceedings. 22nd International Conference on. IEEE, 2002.

(Continued)

*Primary Examiner* — Nnenna Ekpo
(74) *Attorney, Agent, or Firm* — Robert D. Shedd; Jeffrey M. Navon; Catherine A. Cooper (57) ABSTRACT

A method and apparatus for managing content on a distributed storage system are described including receiving a request to schedule recording of the managed content from at least one of a plurality of networked recording device, the request including a reference for the managed content, determining a replication factor, selecting a number and selecting which of the plurality of networked recording devices are to record the managed content, determining actual program start time and one of starting content ingest and instructing the selected plurality of networked recording devices to start content ingest, fragmenting the requested content and distributing the fragmented content to the selected plurality of networked recording devices and transmitting at least unique content playback reference required to access the content on the distributed storage system.

13 Claims, 8 Drawing Sheets

(56) References Cited

U.S. PATENT DOCUMENTS

2007/0220566 A1* 9/2007 Ahmad-Taylor ................ 725/89
2010/0021138 A1   1/2010 Perrault et al.

OTHER PUBLICATIONS

Ramasubramanian, Venugopalan, et al.. "Beehive: O (1) Lookup Performance for Power-Law Query Distributions in Peer-to-Peer Overlays." NSDI. vol. 4. 2004.

* cited by examiner

MANAGING COMMON CONTENT ON A DISTRIBUTED STORAGE SYSTEM

This application claims the benefit, under 35 U.S.C. §365 of International Application PCT/IB11/001525, filed 29 Jun. 2011, which was published in accordance with PCT Article 21(2) on 3 Jan. 2013 in English.

FIELD OF THE INVENTION

The present invention relates to networked recording devices used to store content requested by a user proximate to one or more of the networked recording devices. The determination and selection of the recording devices by the scheduling system is a balance between replication and de-duplication.

BACKGROUND OF THE INVENTION

As storage appears in consumer devices such as gateways, distributed virtual storage systems, using this storage, are also likely to proliferate. The present invention allows such storage networks to be used very effectively to store information common to many users and, in particular, relating to recordings off a schedule such as broadcast/multicast TV content.

SUMMARY OF THE INVENTION

The present invention is directed to a system and method that leverages a managed, distributed storage network to provide explicit de-duplication of common content that is available, such as DVR recordings. As used herein de-duplication means to minimize duplication. Rather than de-duplication based on content signatures or checksums, the system builds in support for known content (such as DVR recordings) explicitly, relying on schedule data and known content sources. Additionally, the system can acknowledge the intent of a recording rather than the actual scheduling such that, for example, even if a user does not record all of a program, all of that program is likely to be available to them.

This concept provides a mechanism for the content to be stored locally in the user's home or in a network, though distributed in such a way as to provide performance, redundancy, and resiliency, while minimizing replication of content.

A method and apparatus for managing content on a distributed storage system are described including receiving a request to schedule recording of the managed content from at least one of a plurality of networked recording device, or a separate scheduling device, the request including a reference for the managed content, determining a replication factor, selecting a number and selecting which of the plurality of networked recording devices are to record the managed content, determining actual program start time and one of starting content ingest and instructing the selected plurality of networked recording devices to start content ingest, fragmenting the requested content and distributing the fragmented content to the selected plurality of networked recording devices and transmitting at least unique content playback reference required to access the content on the distributed storage system.

BRIEF DESCRIPTION OF THE DRAWINGS

The present invention is best understood from the following detailed description when read in conjunction with the accompanying drawings. The drawings include the following figures briefly described below:

FIGS. 6A and 6B are flowcharts of one of the recording devices.

DETAILED DESCRIPTION OF THE PREFERRED EMBODIMENTS

Recording devices such as Digital Video Recorders (DVRs), Personal Video Recorders (PVRs), Set Top Boxes (STBs), store content (data/video content/audio content/multimedia content) either in a central repository (networked recording device), or on the recording devices themselves. The concept described herein assumes that a distributed storage network is available, and relates to leveraging that distributed storage network for the efficient storage of content that would otherwise be replicated among many users (such as DVR content). In doing so, the scheduling, ingest/input and storage of content are abstracted from one another.

There are no known solutions that leverage knowledge of the programs being recorded to store, de-duplicate and replicate this information appropriately in a distributed storage environment.

In a peer-to-peer (P2P) environment, files, or fragments of files are distributed among many different machines. An emerging concept of distributed storage networks takes this concept further, potentially building essentially a virtual file system distributed across many storage devices such as disks. For reliability, typically, any content copied to the network would be processed, fragmented, have error correction data added (such as in Luby Transform (LT) codes for data loss protection), then those fragments would be distributed among many potentially unreliable devices. The net effect of this is that if elements of the network are unavailable, only the amount of data that made up the original file is required to reconstruct it.

Secondarily, by definition, everyone on the network potentiality has access to the same data, de-duplication of data provides substantial benefits in terms of the amount of storage available, and the need for replication of data on the network is related more to the need for performance than anything else. This is because if there were, for example, only one copy of a popular movie on the network, many users may all attempt to access the same fragments at the same time, resulting in oversubscription of the links providing that data. In this instance, it would be important to ensure that the level of replication was sufficient to ensure that the peak demand for file fragments could be serviced. An opposing view would be the need to avoid excess replication to reduce storage requirements overall. Needless to say, a balance needs to be made.

In the event that content was being stored on such a network of recording devices, storing a copy of the content on each device would be extremely inefficient. Due to the obvious replication of content from many devices, traditional de-duplication procedures could be applied (i.e. creating a checksums for and comparing chunks of data to determine duplicates) though these normal de-duplication procedures could be quite inefficient, and a more targeted solution is appropriate. Given that the system potentially has context information regarding the programs being broadcast and what is being recorded, linking this information to the de-duplication system ahead of time means that the storage of traditional content to the managed, distributed storage network could be scheduled ahead of time, and potentially correspond to the exact start/end times of the programs in question. In this way, if a user scheduled a recording, their system may participate in the transfer of some of the information to the network, or, alternatively, may simply register that the particular program was recorded by this user, such that it appears in their list of recorded content, and have that event reference a known file or segments of files residing on the distributed storage network.

Additionally, it may also be possible to structure the files in such a way as to start capturing the data before the program starts and to retrospectively change the pointers to the start of the program dynamically after the actual start time is known. This could either be done through network processing of the file to generate a file that starts at the right point, or re-writing the index of the file fragments to start with an appropriately formed fragment rather than the first elements that were captured.

Figure 1:
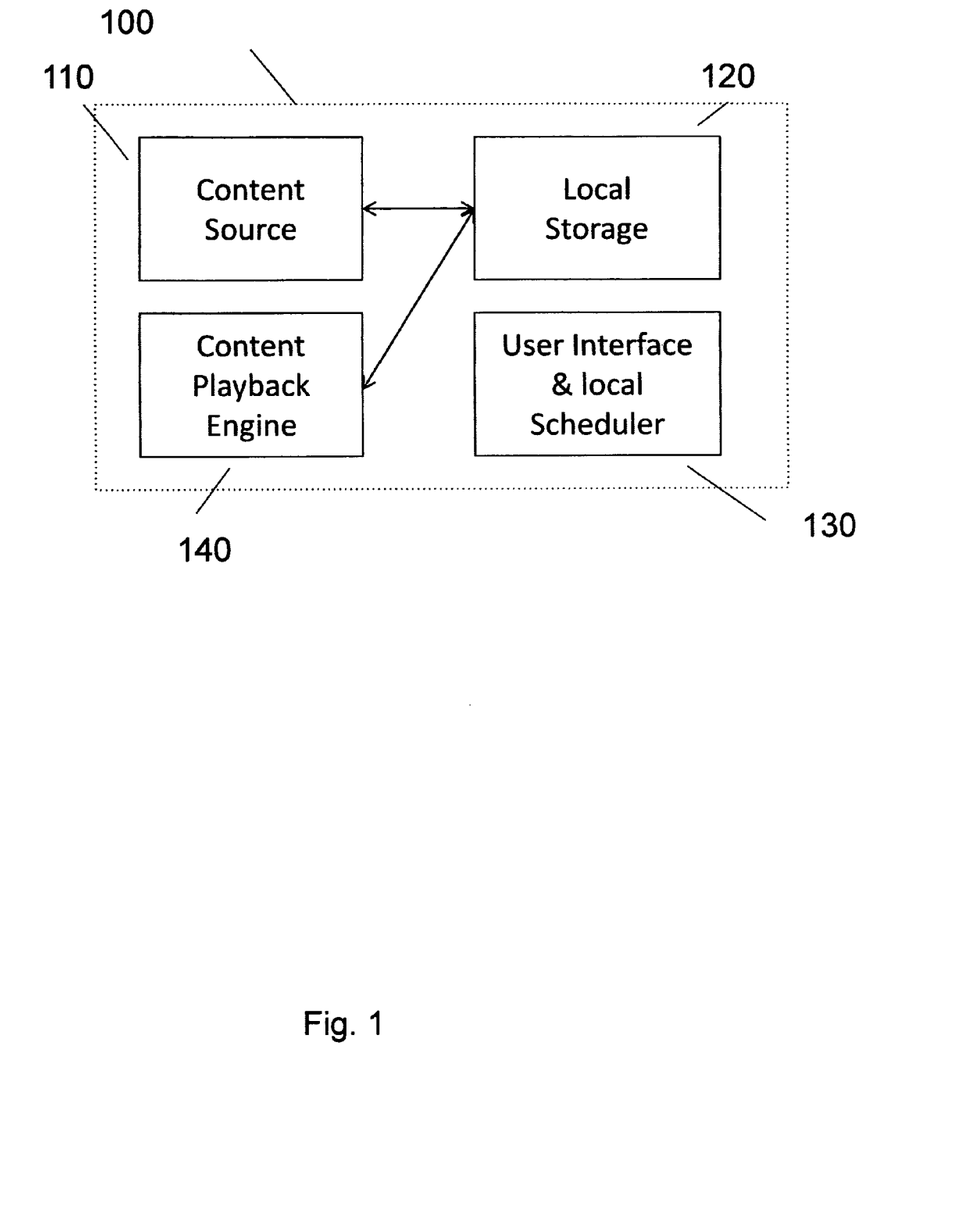
FIG. 1 illustrates a conventional recording device.

Turning to FIG. 1, this illustrates a conventional recording device. This device may, for the sake of illustration, be broken down into a small number of functional blocks including 110 a content source, 120 a local storage device, 130 a scheduling system and user interface and 140 a mechanism to playback the content. The user of this device interacts with the user interface 130 to create a scheduled recording of a particular piece of content. When that scheduled time arrives, an internal system is triggered in the recording device to record that content to the hard drive and make it available to the user by adding it to a list of available content. In some instances, the scheduling of a recording may trigger content to be stored in the network, with references to that content provided to the user's device. Additionally, a network based scheduling system may also be in operation even for locally stored content.

Figure 2:
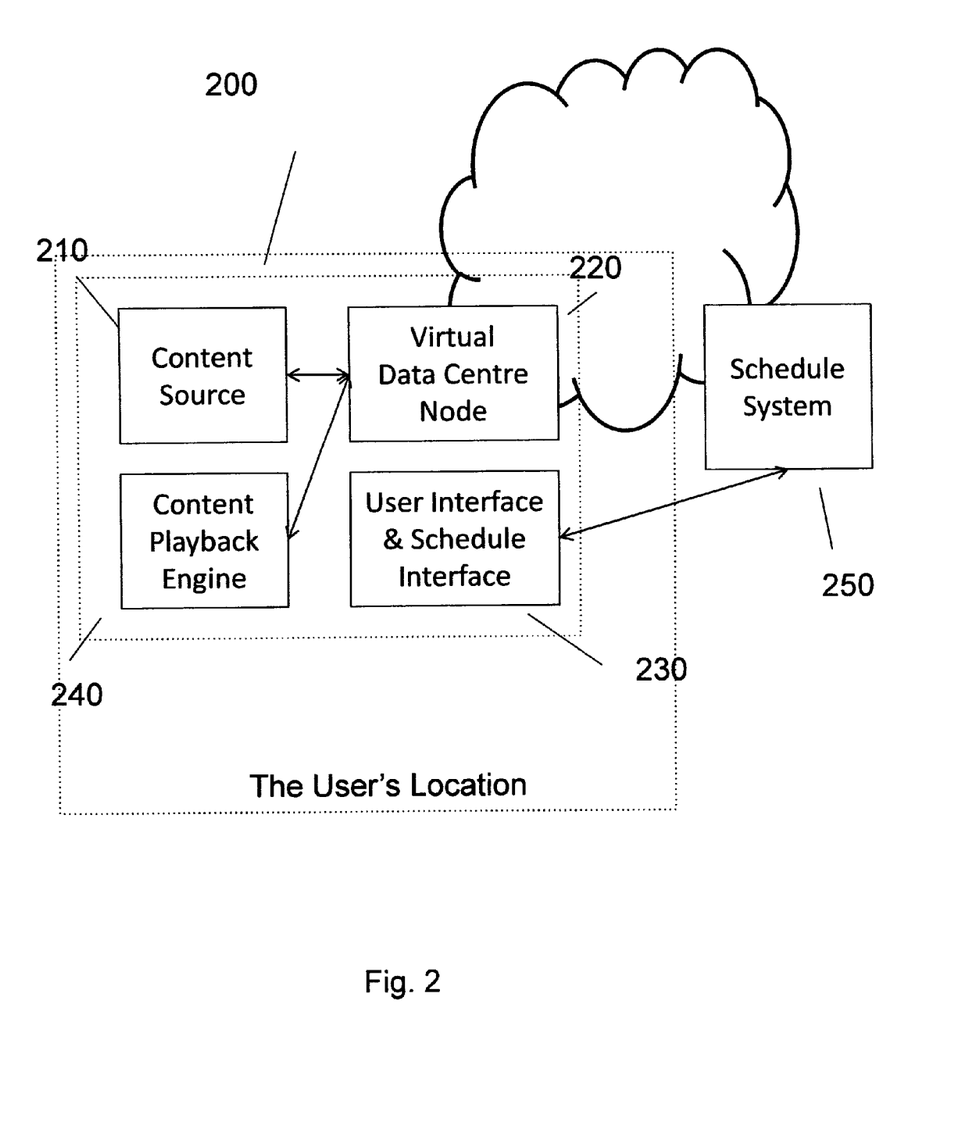
FIG. 2 illustrates an embodiment of the advanced recording device of the present invention with Virtualized Storage.

Referring now to FIG. 2, which is a system level figure representing the simplest possible instantiation of the present invention, where the local disk 110 in the recording device is replaced with a virtualized disk 220 and the "cloud" indicating a network of devices with virtualized storage. In FIG. 2 all elements are in a single functional element. In this instance, while there may (or may not) be a physical disk in the device, access to that disk is through a managed virtual interface shared by all devices in the virtual storage network. Because of the managed nature of this virtual disk system/network, when a recording is scheduled, a network based management system is notified and is ultimately responsible for issuing the commands to the device to take the content and distribute it to the virtual storage network as necessary.

As a result of being network controlled, a user's request for content to be recorded may end up being visible on one or more devices which may be in the user's location. The user's location may be a residence or business or any other location of the user including a public hot spot or even a vehicle. The virtual storage network of the system is networked in a P2P/CDN (content delivery/distribution network) type arrangement. The system 200 contains a mechanism 230 for communication with the centralized scheduling system. The scheduling system could also be distributed among the recording devices. This would, of course, entail additional coordination between and among the networked recording devices.

Note that in the event that the content is protected, i.e. has Conditional Access or DRM rights associated with it, any device playing back the content must, by definition have access to the appropriate keys to decrypt the content. There is an assumption that the same content is being consumed by all users (as in a traditional broadcast environment), and that therefore, identical mechanisms would be used to decrypt as would be used in a conventional DVR. If the service definition called for the content to be re-encrypted for the DVR, this would mean that the content would no longer be the same for all devices, and therefore the system being described would not apply. In this event, it may be possible to add an additional capability to the system to re-encrypt the content into a different form from that which was being broadcast, but which is common to all devices able to access appropriate keys. This re-encryption could be done as part of the function of the virtual storage agent on each device with keys supplied by the network or a separate device in the network.

The likely popularity of a piece of content may be determined by a central scheduling management system 250 that can a) count all the requests to record a particular piece of content, and base the replication of that content on this data, b) schedule a number of end devices to record the content and provide it (or portions of it) to the virtualized storage network and c) provide the devices where the content was scheduled to be recorded with a reference to the appropriate file or files on the network. Alternatively, the system could provide a more simple approach where, as in a more traditional P2P system, each of the fragments are simply distributed to multiple other end points simultaneously, and the index for each file represents this. Therefore, the system could dynamically compensate for any load by, for example, requesting fragments from random sources.

As the scheduling management system 250 schedules each device to deliver content to the network, de-duplication is provided by virtue of the fact that at a minimum the system need only store a single distributed copy of the content, with appropriate overhead for data loss or unavailable device protection. This is opposed to an array of individual devices where a separate copy would be stored on each device. Typically, this overhead may be of the order of 20%, and as the content is spread as fragments over many devices, though this would allow for individual nodes in the network to be unavailable and the data to still be able to be reconstructed. Storing a single copy of the content on the virtual storage network, however, does not necessarily provide adequate performance for consumers trying to access this content.

In determining factors for a replication constant for a particular piece of content, several factors must be considered including:

1) Number of devices that scheduled the recording (S)—Note that if other's are not able to access content unless they scheduled a recording, then this would represent the maximum replication value, assuming appropriately available bandwidth (see below)

2) The average available upstream and downstream bandwidth (ab) of the nodes in the serving area relative to the transmission rate (tr) of the content. Note that "average" available bandwidth implies a relatively uniform distribution of the available bandwidth of devices. Typically the performance and availability would be monitored and managed by the virtual storage management system. The available bandwidth also assumes that this rate is achievable under typical network error conditions such as random data loss.

3) Data chunk size in time (c) and content duration (du)—The smaller the size of the data elements stored on each device, the lower the chance of simultaneous access to these elements. If, for example, an entire file was stored on a single device, then each user accessing the file would be dependent on getting all their data from a single device.

4) Number of devices in the virtual storage network. If this number is low, then multiple data chunks from the file may need to be stored on any given node, increasing the chance of overlapping requests from multiple users. Geographical location may also need to be considered in the equation, though this is more of a factor to be managed by the virtual storage system, where longer distances (and therefore round trip times) need to be considered.

5) Margin of Safety (m). While the other elements allow the basic requirements to be calculated, there are additional dozens of potential interrelated and unpredictable factors that may cause system failures of experience for consumers. This could include unforeseen traffic spikes anywhere in the network, network equipment failures, denial of service attacks, high network error rates, coincidental device failures (due to floods, etc.) In early operation of the system (with a relatively small number of nodes and high disk availability), this value may be conservatively high, such as 100, and can be brought down as the need for disk conservation increases, the population of devices increases, making the data availability more predictable.

Therefore, an example of the equation for calculating the typical replication factor under normal circumstances becomes:

$$\text{Replication Factor} = m*S/(ab/\text{tr})/(du/c) \quad (1)$$

This replication factor would allow each user who scheduled the recording play it back reliably assuming normal and predictable behavior of the network. A larger replication factor would, however, normally be used in reality to account for unforeseen issues with network or content availability, unusual load, etc. Fundamentally, there is a tradeoff between replication factor and potential performance of the system. The greater the replication factor relative to the nominal recommended value, the greater the reliability and resiliency of the service. In an environment with a lot of available storage, a high replication factor would be recommended, whereas where available storage space is very limited, a smaller replication factor may be used, though users may suffer service interruptions as a result.

The system would also allow for recordings to be scheduled independently of consumer requests to record content. In this instance, it may be assumed that the volume of playback would be relatively low for the purposes of replication. Each recording would be assigned a unique identifier (ahead of time) that could be broadcast along with the Electronic Program Guide (EPG) information. In this way, rather than only having recordings available where the user has recorded the content themselves (replicating a traditional recording device model), users of the system could, for example, be enabled to scroll back through an EPG, and select previous programs to play, that have automatically been recorded by the system.

Figure 3:
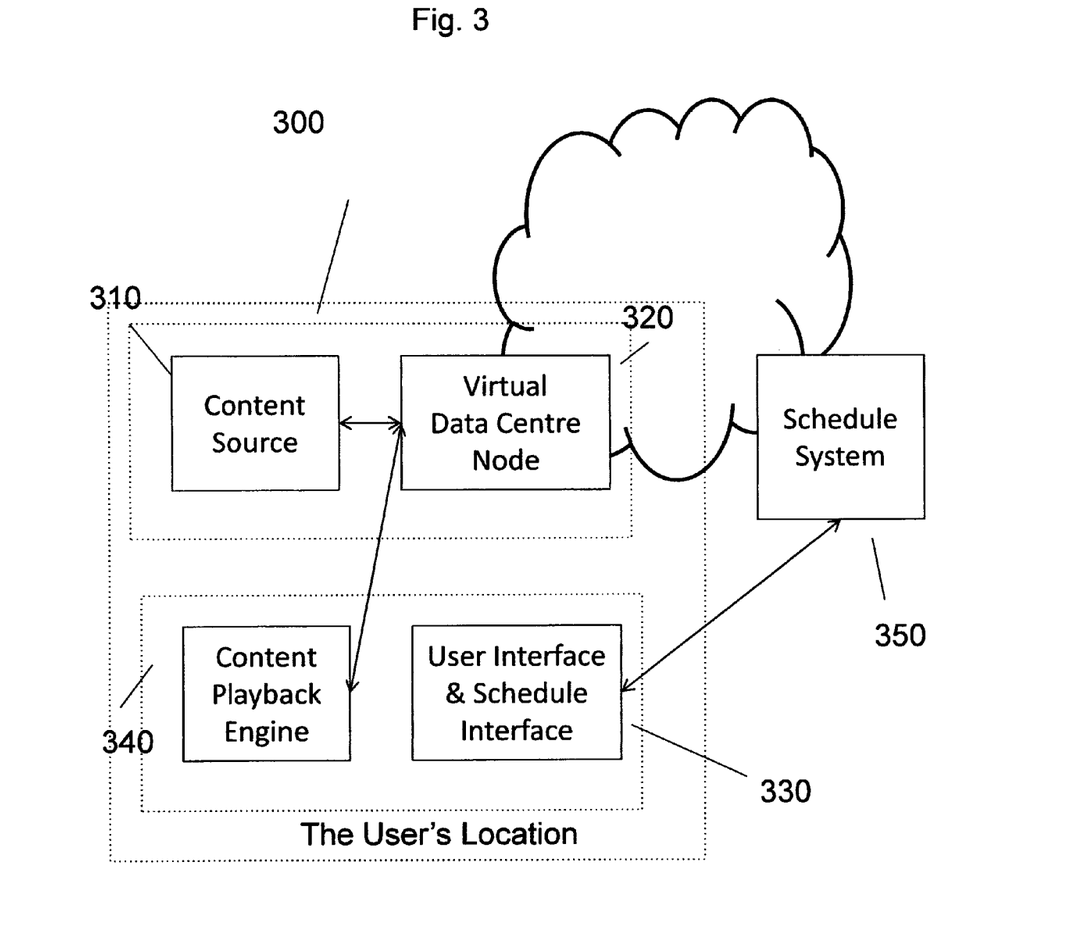
FIG. 3 illustrates an alternative embodiment of the advanced recording device of the present invention with separate functional elements.

Moving to FIG. 3, the concept illustrated is almost identical to that described for FIG. 2, though the elements are no longer contained within a single device in the home. In this case there is a content source 310 and virtualized storage 320 in one device. The capacity to render and schedule recordings is in an entirely different device (330 and 340). That is, there are two functional elements in the device—the first functional element includes a content source 310 and a virtualized storage module 320 and the second functional element includes a content playback engine and a user interface and a schedule interface. An example of such an embodiment may be a gateway device with network connectivity and storage providing the content ingest (input from a DVB-T digital terrestrial signal, for example), and a disk and agent to be part of the virtualized storage environment. A completely separate, though also network connected device such as a tablet, set top box or TV), could provide the user with a user interface to be able to schedule recordings, receive virtual locations for those recordings, and be able to browse and view them, without being physically co-located with the content source or storage. In this instance, content playback would be provided to the rendering device by streaming it over the network to the user's location (e.g., home, office, hot spot, etc.). That is, the user's experience may be abstracted from the storage and content source. Content is scheduled and viewed on a tablet, though the content was received and stored on a single device with virtual storage and content source.

Figure 4A:
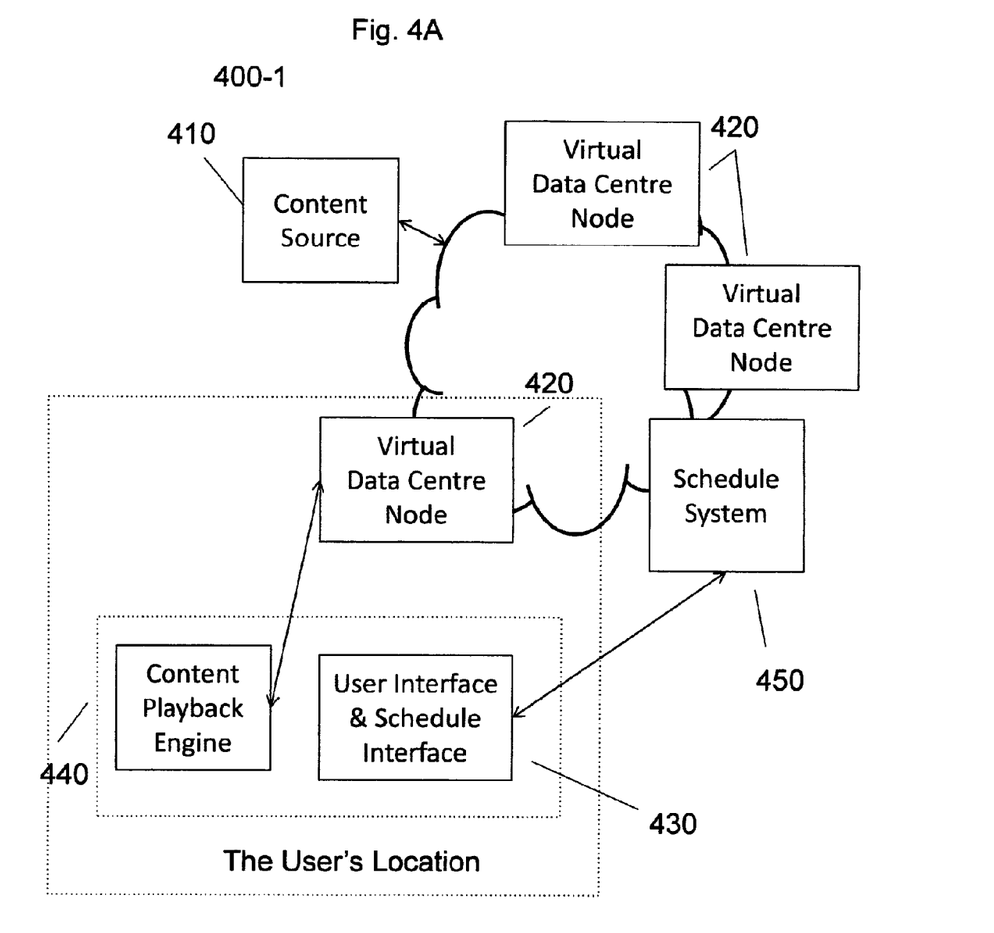
FIG. 4A illustrates another alternative embodiment of the advanced recording device of the present invention with separate functional elements.

In FIG. 4A, another alternative embodiment of the advanced recording device of the present invention is illustrated where the content source is at an entirely separate location from the user. This is more like a conventional network DVR approach, where the source of the content did not actually originate from the user, but from the network. In this embodiment there are two functional elements—the first functional element includes a content playback engine, a user interface and a schedule interface 430 and the second functional element is the virtual storage module 420. In this instance, the user experience may be abstracted from the storage. The content source is not provided by the user, although users effectively have a virtual recording device.

Figure 4B:
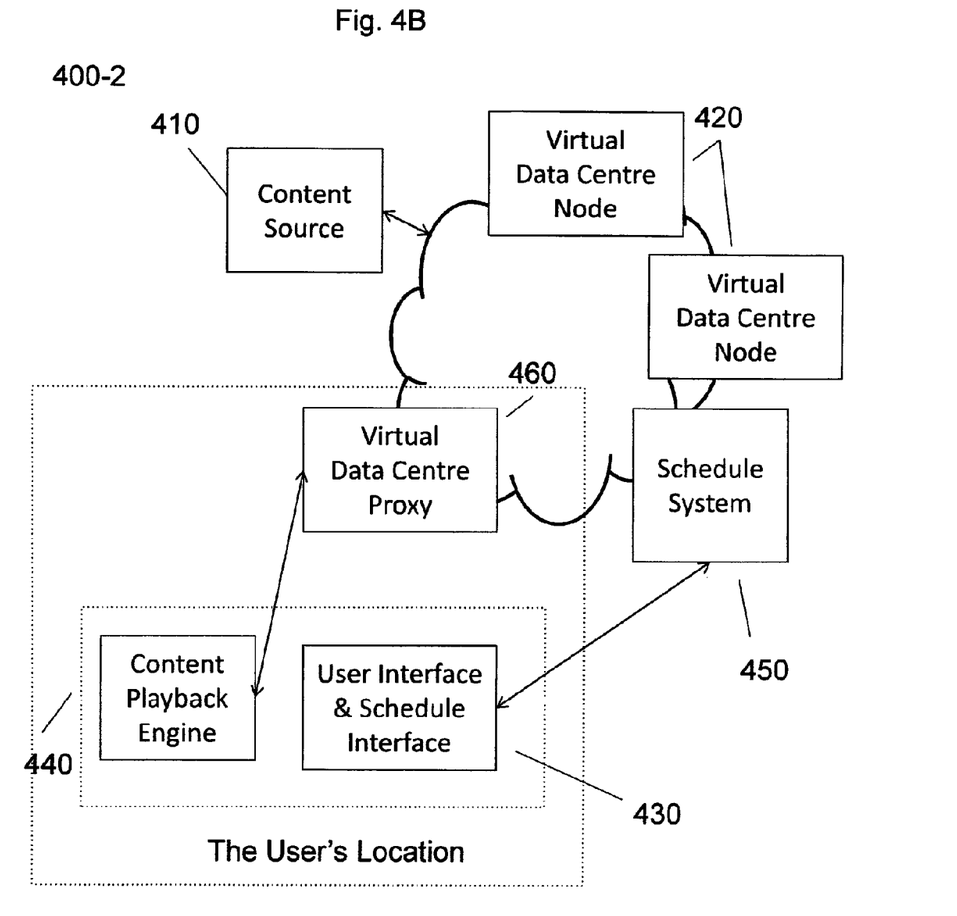
FIG. 4B is yet another alternative embodiment of the advanced recording device of the present invention with a virtual storage proxy.

In a final scenario, as illustrated in FIG. 4B, it may also be possible for a user without a device with virtualized storage to still schedule recordings and access content stored on the virtualized storage network through a separate device that provides access to the virtualized storage network without necessarily being a participant of it. In this instance, the user would access the content through a virtualized storage proxy 460, which is an agent that provides access to the virtual storage network without having the local storage participating in it. This proxy would be very similar to the agent that provides full access to the virtualized storage network, though would exclude the piece required for the management of the local disk and its participation in that network.

It is also possible to have combinations of these scenarios, for example, where the content source is provided through a source in the user's home (as in FIG. 3), though there is no local disk (as in FIG. 4B). For example, the content may be contributed directly to the network by the user, though they are not contributing to the virtual storage as they have none themselves. FIG. 4B is similar to FIG. 4A except that the virtual storage is replaced by a virtual storage proxy. In both these scenarios, the user experience is abstracted from the storage and while the content source is not provided by the user, users effectively have a virtual recording device.

Figure 5:
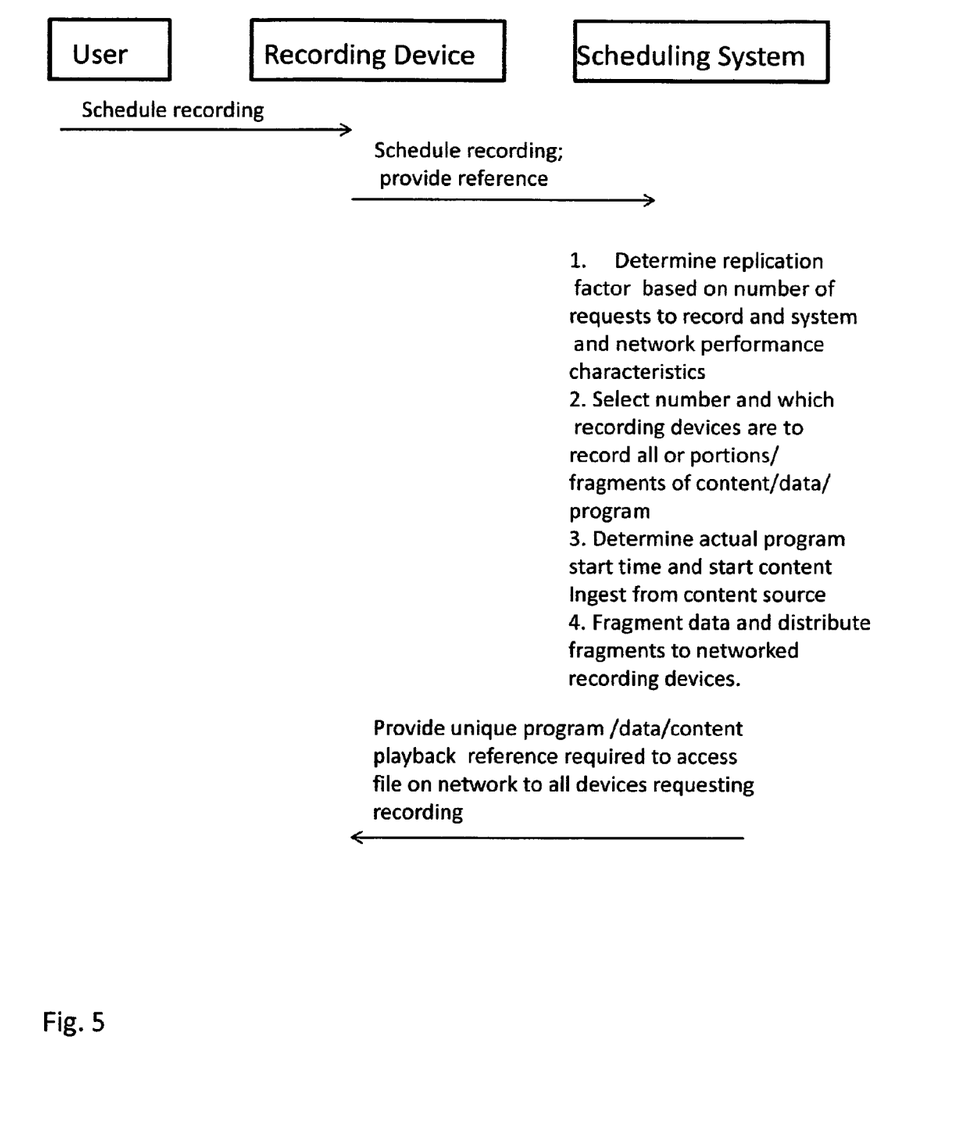
FIG. 5 is a "ladder" diagram of the present invention.

FIG. 5 is a "ladder" diagram of the present invention. A user sends/transmits a request to schedule a recording of content to a recording device located proximate to the user. For simplicity, the combination of a virtualized storage device and scheduling interface will hereafter be referred to as a recording device, which is, by definition, networked. The recording device sends/transmits a request to schedule the recording of content to the scheduling system. The recording device provides a reference for the requested content. The reference would take the form of a Globally Unique Identifier for that piece of content that, when queried by the virtual storage agent, results in a response of all the required data for that piece of content such as a reference to the file index for that content which will allow the system to access all the necessary pieces from the virtual storage network to reconstruct the file. It may also contain a reference to associated metadata (such as time, date and channel of recording, title, duration, storage status, how long the recording will remain available, associated graphics, thumbnails, etc.).

The scheduling system determines a replication factor equating to how many copies of the content will be made on the network. The more copies made on the network, the more users will be able to access the content simultaneously and the greater the resiliency the system will have to errors, unforeseen demand and other issues, though the more space the content will consume on the network.

Upstream bandwidth for users contributing content is important. Users may only be able to contribute content non-real time (e.g for ADSL or cable upstream rates may be less than the data rate of the content). Therefore, users may only be asked to contribute a certain portion of the content, and this may be in a non-real time fashion. Error rate for users is also potentially significant, as is availability and reliability of devices, and the amount of free bandwidth on users'/consumers' pipes. The key in determining distribution, however, is the amount of likely simultaneous requests against the data rate of the stream and available upstream bandwidth to deliver that data.

The system must accommodate these variables, and the key factor is that if, for example, a large number of people schedule the recording of a particular show, and the average bandwidth upstream from the virtual storage devices to deliver that show is less than the data rate of the show itself, then it will be necessary for the playback devices to get data from multiple virtual storage devices at once, and the larger the number of scheduled recordings, the larger the likely number of simultaneous playback requests and therefore the greater the replication factor for storing the content on the virtualized storage system.

The scheduling system then selects the number of and which devices are to deliver all or portions/fragments of the requested content/data/program. The determination of the number of contributing devices is based at least in part on minimizing replication balanced against ensuring that the level of replication is sufficient to ensure that the peak demand for file fragments can be serviced.

The scheduling system then manages the devices/nodes to deliver all or portions/fragments of the content to the selected virtual storage devices. The scheduling system then provides a unique program/content/data playback reference required to access the requested content/data/file on the network, to the one or more selected recording devices. It needs to be remembered that one or more of the selected devices may or may not have requested the content/data/program. The user is then able to retrieve the requested content from the networked recording devices at the user's convenience.

Figure 6A:
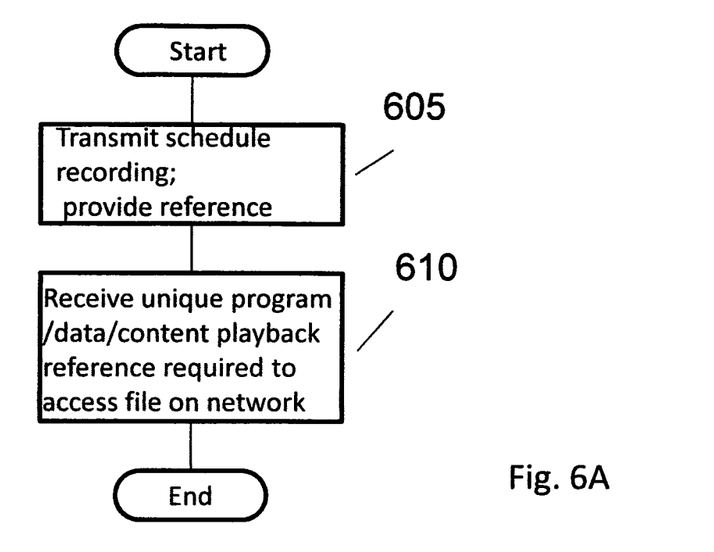
FIG. 6A is a recording device that not only requests the content but receives the content or a portion thereof.
Figure 6B:
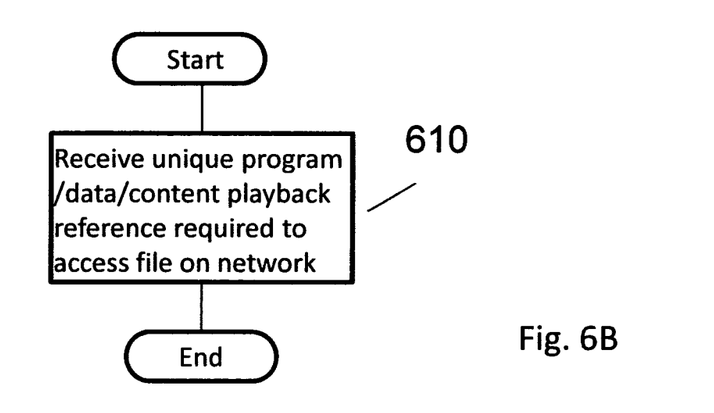
FIG. 6B is a recording device that may not have requested the content but is a networked recording device upon which the content will be recorded and later able to be retrieved by the requesting user (via his/her attached recording device).

FIGS. 6A and 6B are flowcharts of one of the recording devices. FIG. 6A is a recording device that not only requests the content but receives the content or a portion thereof. FIG. 6B is a recording device that may not have requested the content but is a networked recording device upon which the content will be recorded and later able to be retrieved by the requesting user (via his/her attached recording device, which is the recording device located proximate to the requesting user). Referring to FIG. 6A the recording device sends/transmits a request for content/data to the scheduling system also providing a reference for the requested content/data. The recording device then may receive a unique program/content/data playback reference required to access the content/data/program file (or fragments thereof) from the scheduling system. In FIG. 6B the recording device receives a unique program/content/data playback reference required to access the content/data/program file (or fragments thereof) from the scheduling system. In this case, the recording device did not request the content/data/program but is one of the networked recording devices used to store all or portions/fragments of the requested content/data.

Figure 7:
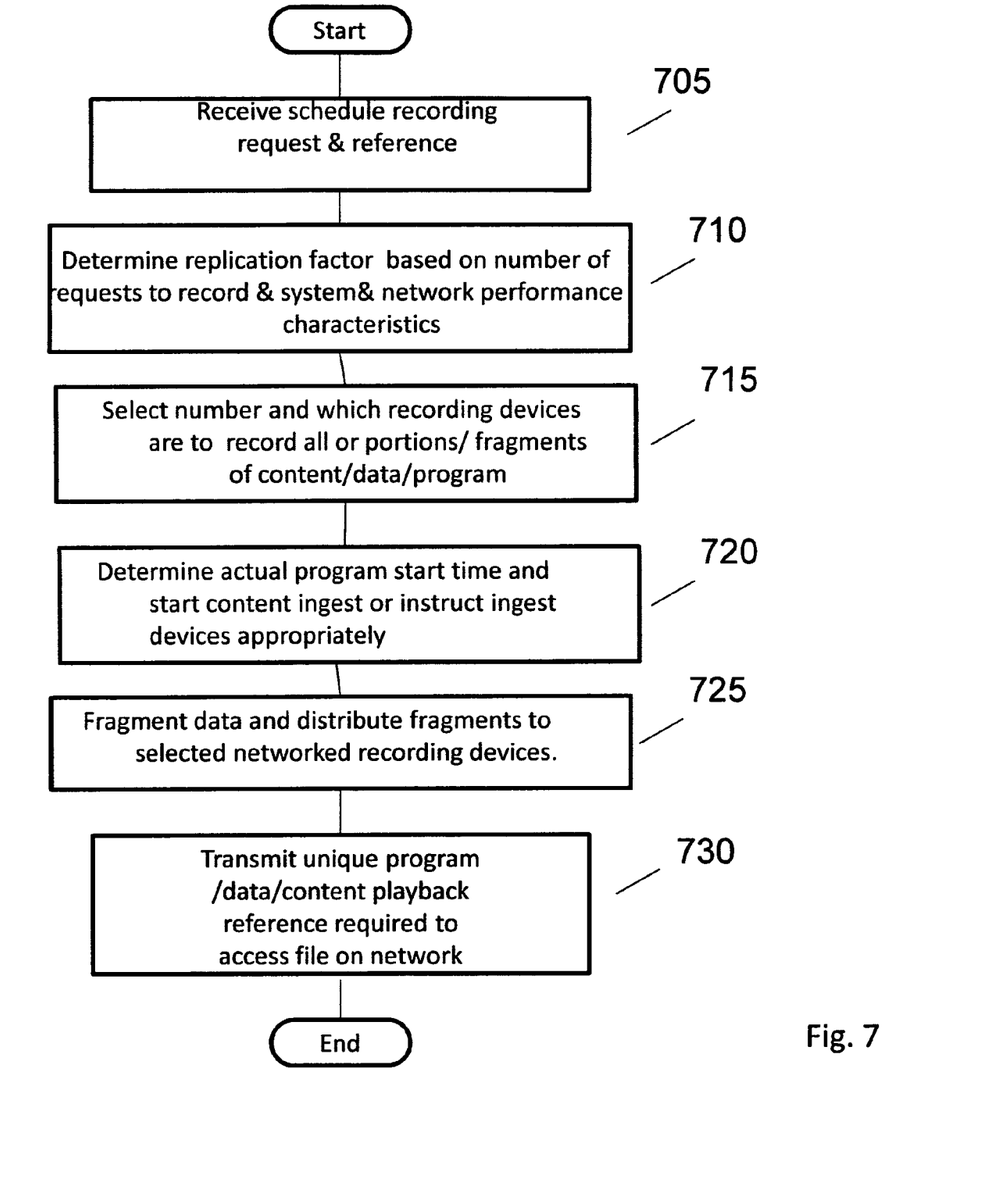
FIG. 7 is a flowchart of the scheduling system.

FIG. 7 is a flowchart of the scheduling system. The scheduling system receives a request to schedule recording of requested content from one or more of the networked recording devices at 705. The request originated with a user located proximate to one or more of the recording devices. The received request is accompanied by a reference for the requested content/data. The scheduling system determines a replication factor as described previously at 710. The scheduling system then selects the number of and which recording devices are to record all or portions/fragments of the requested content/data/program at 715. The determination of the number of recording devices is based at least in part on minimizing replication balanced against ensuring that the level of replication is sufficient to ensure that the peak demand for file fragments can be serviced. The scheduling system determines the actual program start time and starts content ingest or instructs ingest devices appropriately at 720. The scheduling system then copies all or portions/fragments to the selected network recording devices at 725. The scheduling system then provides a unique program/content/data playback reference required to access the requested content/data/file on the network, to the one or more selected recording devices at 730. It needs to be remembered that one or more of the selected recording devices may or may not have requested the content/data/program. The user is then able to retrieve the requested content from the networked recording devices at the user's convenience.

In the case of FIGS. 2-4B, the means for receiving a request to schedule recording of the managed content from at least one of a plurality of networked recording devices, or other scheduling device, is performed by the scheduling system. The request includes a reference to the managed content. The means for determining a replication factor is performed by said the scheduling system. The means for selecting a number and selecting which of the plurality of networked recording devices are to record the requested content is also performed by the scheduling system. The means for determining actual program start time and one of starting content ingest and instructing the selected plurality of networked recording devices to start content ingest is performed by the scheduling system. The means for fragmenting the requested content and distributing the fragmented content to the selected plurality of networked recording devices is also performed by the scheduling system. The means for transmitting at least one unique content playback reference required to access the content on the distributed storage system may also be performed by the scheduling system, though in the case of FIGS. 2-4B, the means for receiving unique content playback references to access the managed content stored on the distributed storage system is performed by the virtual data centre node or virtual data centre proxy.

It is to be understood that the present invention may be implemented in various forms of hardware, software, firmware, special purpose processors, or a combination thereof.

Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It is to be further understood that, because some of the constituent system components and method steps depicted in the accompanying figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

The invention claimed is:

1. A method for managing content on a distributed storage system, said method comprising:
   receiving a request to schedule recording of said managed content from at least one of a plurality of networked recording devices, said request including a reference to said managed content;
   determining a replication factor, wherein said replication factor identifies a number of copies of the managed content to be produced and is responsive to a number of requests received for said managed content, system performance characteristics and network performance characteristics, wherein said system performance characteristics include a chunk size of said managed content and duration of said managed content, wherein said network performance characteristics include an average available upstream bandwidth relative to a transmission rate and an average available downstream bandwidth relative to said transmission rate;
   selecting a number of networked recording devices and selecting which of said plurality of networked recording devices are to record said managed content based on minimizing replication and ensuring servicing of peak demand for said managed content;
   determining actual program start time and one of starting content ingest and instructing said selected plurality of networked recording devices to start content ingest;
   fragmenting said requested managed content and distributing said fragmented managed content to said selected plurality of networked recording devices; and
   transmitting at least unique content playback reference required to access said managed content on said distributed storage system to said selected plurality of networked recording devices.

2. The method according to claim 1, wherein said managed content is one of audio content, video content, data and broadcast content.

3. The method according to claim 1, said distributed storage system is a virtual storage system.

4. The method according to claim 1, wherein said network performance characteristics further include a number of networked recording devices in said distributed storage system and geographical location of said networked recording devices in said distributed storage system.

5. The method according to claim 1, wherein said replication factor is weighted to account for unforeseen issues with network availability, content availability or unusual load.

6. The method according to claim 1, wherein managed content is scheduled for recording independent of said request to record said managed content.

7. The method according to claim 1, wherein said networked recording devices include personal video recorders, digital video recorders, set top boxes and gateways.

8. An apparatus for managing content on a distributed storage system, comprising:
   a scheduling system including a processor and a plurality of communication ports for connection with a plurality of networked recording devices, said processor configured to receive a request to schedule recording of said managed content from at least one of a plurality of networked recording devices, said request including a reference to said managed content; determine a replication factor, wherein said replication factor identifies a number of copies of the managed content to be produced and is responsive to a number of requests received for said managed content, system performance characteristics and network performance characteristics, wherein said system performance characteristics include a chunk size of said managed content and duration of said managed content, wherein said network performance characteristics include an average available upstream bandwidth relative to a transmission rate and an average available downstream bandwidth relative to said transmission rate; select a number of networked recording devices and which of said plurality of networked recording devices are to record said requested managed content based on minimizing replication and ensuring servicing of peak demand for said managed content; determine actual program start time and one of starting content ingest and instructing said selected plurality of networked recording devices to start content ingest; fragment said requested managed content and distributing said fragmented managed content to said selected plurality of networked recording devices; and transmit at least unique content playback reference required to access said managed content on said distributed storage system to said selected plurality of networked recording devices.

9. The apparatus according to claim 8, wherein said managed content is one of audio content, video content, data and broadcast content.

10. The apparatus according to claim 8, wherein said distributed storage system is a virtual storage system.

11. The apparatus according to claim 8, wherein said network performance characteristics further include a number of networked recording devices in said distributed storage system and geographical location of said networked recording devices in said distributed storage system.

12. The apparatus according to claim 8, wherein said replication factor is weighted to account for unforeseen issues with network availability, content availability or unusual load.

13. The apparatus according to claim 8, wherein managed content is scheduled for recording independent of said request to record said managed content.

* * * * *